(12) United States Patent
Takagi

(10) Patent No.: US 11,212,882 B2
(45) Date of Patent: Dec. 28, 2021

(54) INFORMATION PROCESSING APPARATUS AND INFORMATION PROCESSING METHOD FOR PRESENTATION OF A COOKING SITUATION BASED ON EMOTION OF A USER

(71) Applicant: SONY CORPORATION, Tokyo (JP)

(72) Inventor: Yoshinori Takagi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 297 days.

(21) Appl. No.: 16/328,837

(22) PCT Filed: Jul. 5, 2017

(86) PCT No.: PCT/JP2017/024627
§ 371 (c)(1),
(2) Date: Feb. 27, 2019

(87) PCT Pub. No.: WO2018/066190
PCT Pub. Date: Apr. 12, 2018

(65) Prior Publication Data
US 2019/0223260 A1 Jul. 18, 2019

(30) Foreign Application Priority Data

Oct. 7, 2016 (JP) .............................. JP2016-199029

(51) Int. Cl.
*G06F 3/01* (2006.01)
*H05B 6/12* (2006.01)
(Continued)

(52) U.S. Cl.
CPC ............. *H05B 6/1218* (2013.01); *F24C 7/08* (2013.01); *F24C 7/083* (2013.01); *G06F 3/011* (2013.01);
(Continued)

(58) Field of Classification Search
CPC ........ H05B 6/1218; H05B 6/12; Y02B 40/00; G06K 9/00302; G06K 9/00315; G06F 2203/011
See application file for complete search history.

(56) References Cited

U.S. PATENT DOCUMENTS 9,464,819 B2 * 10/2016 Enohara .................... F24F 11/30
2008/0099449 A1 * 5/2008 England ................... F24C 7/082
219/121.48
(Continued)

FOREIGN PATENT DOCUMENTS

CN 1445481 A 10/2003
CN 101375104 A 2/2009
(Continued)

OTHER PUBLICATIONS

Google Patents translation of Park, KR20060010225A, 6 pages. (Year: 2006).*
(Continued)

*Primary Examiner* — Dino Kujundzic
(74) *Attorney, Agent, or Firm* — Chip Law Group

(57) ABSTRACT

Provided is an information processing apparatus, an information processing method, and a program capable of changing a presentation of a cooking situation in accordance with a user emotion. An information processing apparatus including an emotion detection unit that detects an emotion of a user and a control unit that performs control such that a heating situation during cooking is displayed and output. The control unit changes display of the heating situation in accordance with a user emotion detected by the emotion detection unit.

11 Claims, 15 Drawing Sheets

(51) Int. Cl.
G06K 9/00 (2006.01)
F24C 7/08 (2006.01)
G06F 3/0481 (2013.01)

(52) U.S. Cl.
CPC ....... G06F 3/0481 (2013.01); G06K 9/00315 (2013.01); H05B 6/12 (2013.01); *G06F 2203/011* (2013.01)

(56) References Cited

U.S. PATENT DOCUMENTS

| | | | |
|---|---|---|---|
| 2009/0002178 A1* | 1/2009 | Guday | G06F 3/0346 340/573.1 |
| 2009/0110246 A1* | 4/2009 | Olsson | H04M 1/72427 382/118 |
| 2010/0231506 A1* | 9/2010 | Pryor | F24C 15/2021 345/156 |
| 2011/0007142 A1* | 1/2011 | Perez | G06F 3/011 348/77 |
| 2012/0206603 A1 | 8/2012 | Rekimto et al. | |
| 2017/0094049 A1* | 3/2017 | Kanevsky | H04W 12/02 |
| 2018/0292092 A1* | 10/2018 | Bhogal | A23L 5/17 |
| 2019/0332680 A1* | 10/2019 | Wang | G06F 40/30 |
| 2020/0333033 A1* | 10/2020 | Kitagawa | G06T 7/215 |

FOREIGN PATENT DOCUMENTS

| | | |
|---|---|---|
| CN | 102293050 A | 12/2011 |
| CN | 103974657 A | 8/2014 |
| CN | 105358913 A | 2/2016 |
| CN | 105546589 A | 5/2016 |
| CN | 205279178 U | 6/2016 |
| JP | 2003-272815 A | 9/2003 |
| JP | 3909518 B2 | 4/2007 |
| JP | 2008-004387 A | 1/2008 |
| JP | 2015-192844 A | 11/2015 |
| KR | 10-0487290 B1 | 5/2005 |
| KR | 10-2006-0010225 A | 2/2006 |
| KR | 20060010225 A * | 2/2006 |
| KR | 10-2016-0012849 A | 2/2016 |
| WO | 2016/031405 A1 | 3/2016 |

OTHER PUBLICATIONS

Google Patents translation of Matsumo et al., JP2003272815A, 9 pages. (Year: 2003).*

International Search Report and Written Opinion of PCT Application No. PCT/JP2017/024627, dated Aug. 1, 2017, 07 pages of ISRWO.

Office Action for CN Patent Application No. 201780058010.2, dated Sep. 6, 2021, 9 pages of Office Action and 13 pages of English Translation.

* cited by examiner

FIG. 11
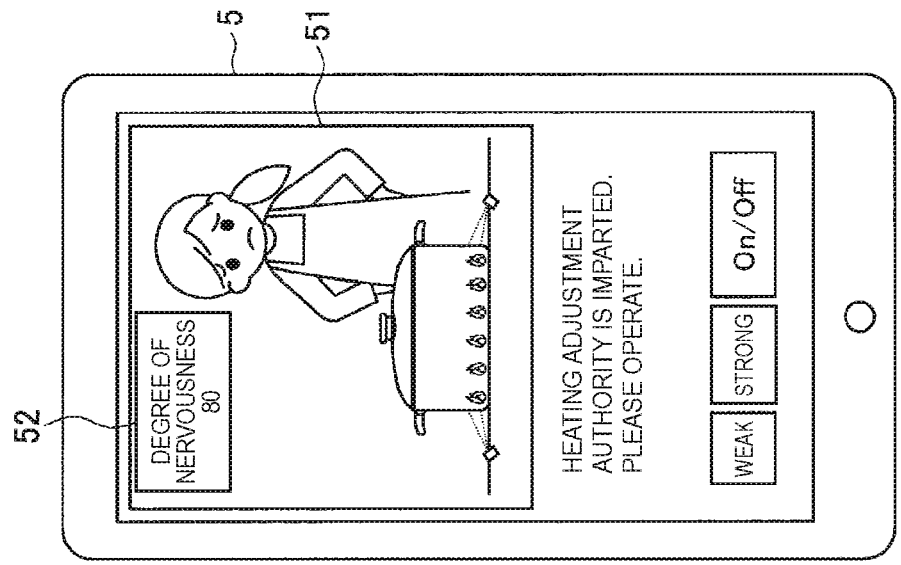
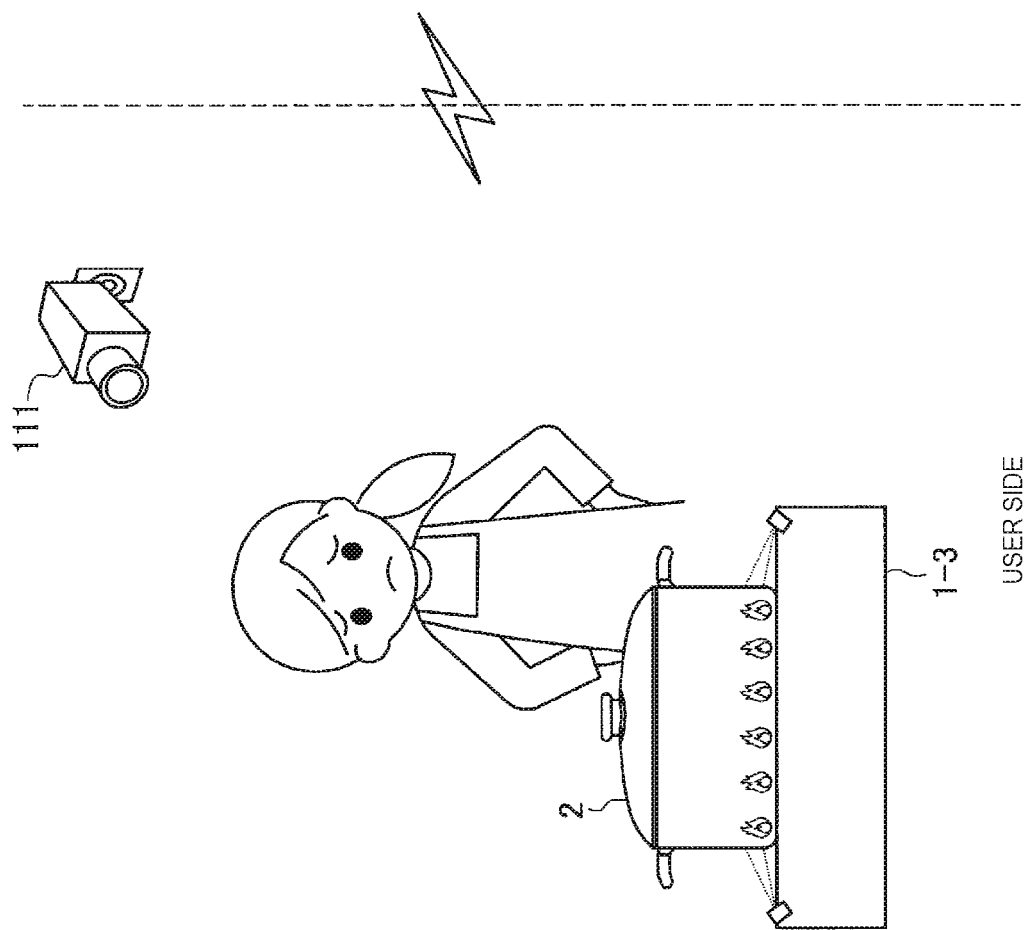

INFORMATION PROCESSING APPARATUS AND INFORMATION PROCESSING METHOD FOR PRESENTATION OF A COOKING SITUATION BASED ON EMOTION OF A USER

CROSS REFERENCE TO RELATED APPLICATIONS

This application is a U.S. National Phase of International Patent Application No. PCT/JP2017/024627 filed on Jul. 5, 2017, which claims priority benefit of Japanese Patent Application No. JP 2016-199029 filed in the Japan Patent Office on Oct. 7, 2016. Each of the above-referenced applications is hereby incorporated herein by reference in its entirety.

TECHNICAL FIELD

The present disclosure relates to an information processing apparatus, an information processing method, and a program.

BACKGROUND ART

In recent years, electric heating cookers that use heating coils for cooking with electricity have been gaining widespread use from the perspective of safety and high energy efficiency. Such an electric heating cooker heats a cooking utensil as an object to be heated which is placed on a top panel, and displays the heating power by turning on a lamp or the like. However, different from a gas stove that uses fire, the electric heating cooker is difficult for a user to intuitively grasp the strength of heating power.

With respect to such an electric heating cooker, for example, Patent Literature 1 below discloses a technique of illuminating, on a stove including a top panel that transmits light, the side of a cooking utensil being heated from under the top panel, and allowing a user to easily recognize that the cooking utensil is being heated even if the user is not standing right in front of the stove.

In addition, Patent Literature 2 below discloses a technique of displaying a projection on the outer surface of a cooking utensil to facilitate a user to sensuously understand a heating output. In addition, Patent Literature 3 below discloses a technique of displaying a heating state in a way more similar to a gas cooker irrespective of the shape or size of a cooking container.

CITATION LIST

Patent Literature

Patent Literature 1: JP 2008-004387A
Patent Literature 2: JP 2003-272815A
Patent Literature 3: JP 3909518B

DISCLOSURE OF INVENTION

Technical Problem

However, all of the techniques described above aim to accurately show a heating situation, but do not take entertaining effects into consideration. For example, too large a flame terrifies a person, but a small lit flame imparts ease and relaxing effects.

Accordingly, the present disclosure proposes an information processing apparatus, an information processing method, and a program capable of changing a presentation of a cooking situation in accordance with a user emotion.

Solution to Problem

According to the present disclosure, there is proposed an information processing apparatus including: an emotion detection unit configured to detect an emotion of a user; and a control unit configured to perform control such that a heating situation during cooking is displayed and output. The control unit changes display of the heating situation in accordance with a user emotion detected by the emotion detection unit.

According to the present disclosure, there is proposed an information processing method including, by a processor: detecting an emotion of a user; performing control such that a heating situation during cooking is displayed and output; and changing display of the heating situation in accordance with the detected user emotion.

According to the present disclosure, there is proposed a program for causing a computer to function as an emotion detection unit configured to detect an emotion of a user, and a control unit configured to perform control such that a heating situation during cooking is displayed and output. The control unit changes display of the heating situation in accordance with a user emotion detected by the emotion detection unit.

Advantageous Effects of Invention

According to the present disclosure as described above, it is possible to change a presentation of a cooking situation in accordance with a user emotion.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram describing cooking situation sharing according to the third embodiment.

MODE(S) FOR CARRYING OUT THE INVENTION

Figure 1:
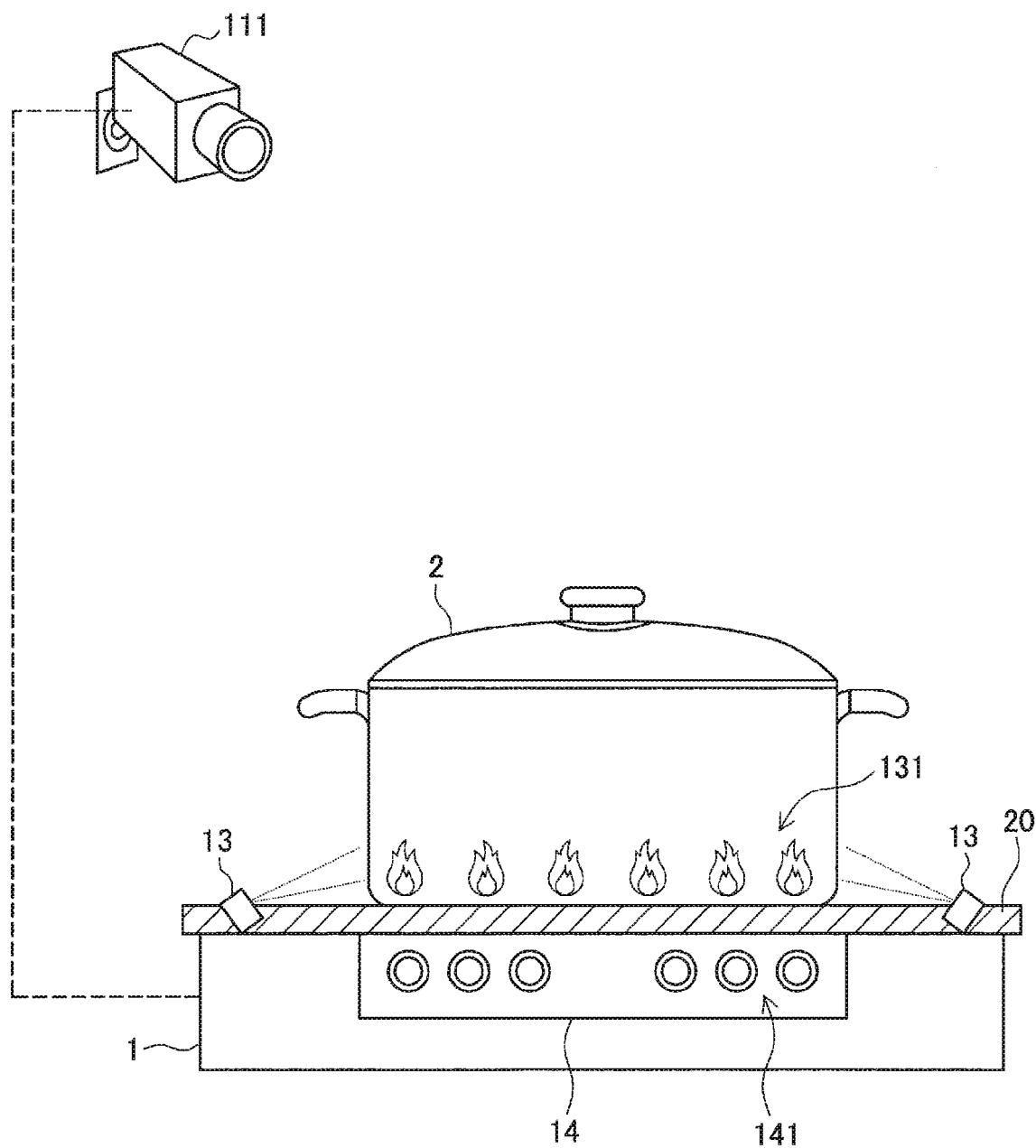
FIG. 1 is a diagram describing an overview of an entertainment cooking system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.
1. Overview of Entertainment Cooking System according to Embodiment of the Present Disclosure
2. Respective Embodiments
2-1. First Embodiment
2-2. Second Embodiment
2-3. Third Embodiment
2-4. Supplemental Information
3. Conclusion 1. Overview of Entertainment Cooking System According to Embodiment of the Present Disclosure First, the overview of an entertainment cooking system according to an embodiment of the present disclosure will be described. FIG. 1 is a diagram describing the overview of an entertainment cooking system according to an embodiment of the present disclosure.

As illustrated in FIG. 1, the entertainment cooking system according to the present embodiment includes a heating cooker 1 (information processing apparatus), and a camera 111 that images the area around the cookery. The heating cooker 1 includes a heating unit 14 and a top panel 20, and a cooking utensil 2 is placed on the top panel 20. Making an electric current flow through a heating coil 141 of the heating unit 14 disposed under the top panel 20 enables the heating cooker 1 to heat the cooking utensil 2 placed on the top panel 20.

In addition, the heating cooker 1 according to the present embodiment includes, for example, an output unit 13 that outputs an image by making a projection. The output unit 13 projects a flame image 131 corresponding to a heating situation (strength of a heating output) by the heating coil 141 on the outer surface of the cooking utensil 2. This allows a user to intuitively grasp a heating situation by the heating cooker 1 like a gas stove that uses fire.

Further, the heating cooker 1 according to the present embodiment can use the camera 111 to image a facial expression of a user, detect an emotion of the user, and change the flame image 131 with the emotion of the user taken into consideration. Specifically, the heating cooker 1 changes the size, color, flickering, or the like of the flame image 131 such that a user has a pleasant emotion. This makes it possible to present entertainment such as imparting relaxing effects to a user during cooking or preventing a user from being bored while waiting for a stew.

The overview of the entertainment cooking system according to the present embodiment has been described above. Next, the heating cooker 1 that implements the entertainment cooking system according to the present embodiment will be specifically described by using a plurality of embodiments.

2. Respective Embodiments 2-1. First Embodiment

First, a heating cooker 1-1 according to a first embodiment of the present disclosure will be described with reference to FIGS. 2 to 4.

2-1-1. Configuration

Figure 2:
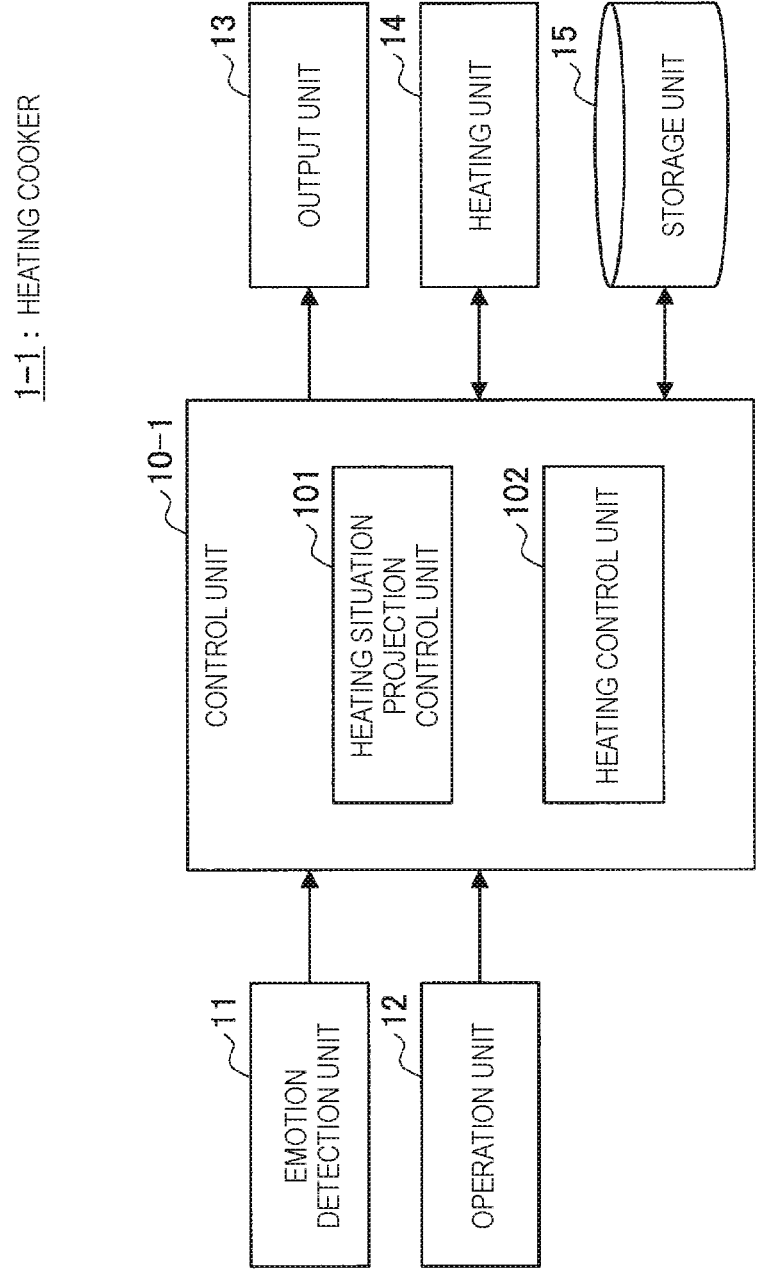
FIG. 2 is a block diagram illustrating an example of a configuration of a heating cooker according to a first embodiment.

FIG. 2 is a block diagram illustrating an example of the configuration of the heating cooker 1-1 according to the first embodiment. As illustrated in FIG. 2, the heating cooker 1-1 includes a control unit 10-1, an emotion detection unit 11, an operation unit 12, an output unit 13, a heating unit 14, and a storage unit 15.

The control unit 10-1 functions as an arithmetic processing apparatus and a control apparatus, and controls the overall operation of the heating cooker 1-1 in accordance with a variety of programs. The control unit 10-1 is implemented, for example, by an electronic circuit such as a central processing unit (CPU) and a microprocessor. In addition, the control unit 10-1 may include a read only memory (ROM) that stores a program, an arithmetic parameter and the like to be used, and a random access memory (RAM) that temporarily stores a parameter and the like varying as appropriate.

In addition, the control unit 10-1 according to the present embodiment also functions as a heating situation projection control unit 101 and a heating control unit 102.

The heating situation projection control unit 101 performs control such that the display showing a heating situation by the heating unit 14 is projected by the output unit 13. The display showing a heating situation is a flame image (either a still image or a moving image) that is proportionate in size (or number and color) to a heating output. In addition, the heating situation projection control unit 101 according to the present embodiment can also change a flame image to be projected in accordance with a user emotion detected by the emotion detection unit 11 described below. For example, the heating situation projection control unit 101 changes the size or flickering of a flame such that a user has a pleasant emotion, and imparts relaxing effects and fun to the user. A user emotion detected by the emotion detection unit 11 may include a plurality of emotion parameter values defined according to an emotion model. Specifically, for example, JP 2005-64839A is cited and a biaxial emotion model may be used that includes the two axes of a first axis indicating the degree of approximation to pleasure or unpleasure, and a second axis indicating the degree of approximation to excitement or nervousness and relaxedness. In this case, the state of each emotion in an emotion two-dimensional space defined by the two axes is expressed by emotion parameters including a parameter (coordinate value) in a first axial direction and a parameter (coordinate value) in a second axial direction. The heating situation projection control unit 101 feeds back such an emotion detection result, and changes the size and flickering of a flame such that a user emotion becomes a "pleasant emotion." For example, in the case where a user emotion swings in a "pleasure (acceptance)" direction in the above-described first axis of the emotion when the size and flickering of a flame is changed, the heating situation projection control unit 101 keeps making a change in that direction. In contrast, in the case where a user emotion swings in an "unpleasure (rejection direction)" direction, the heating situation projection control unit 101 makes the change in the opposite direction.

The heating control unit 102 controls a heating output by the heating unit 14. For example, the heating control unit 102 controls the "weak," "strong," "ON/OFF," and the like of the heating output in accordance with a user operation from the operation unit 12.

The emotion detection unit 11 has a function of detecting a user emotion (such as joy, sadness, anger, surprise, anxiety, or disgust). For example, the emotion detection unit 11 recognizes a face image of a cooking user from a captured image taken by the camera 111, and quantifies a user emotion from a recognition result of the face image. In addition, the emotion detection unit 11 can also recognize the speech content, voice tone, and the like of a user from user speech picked up by a microphone, and quantify a user emotion. Further, the emotion detection unit 11 can also recognize biological information (such as pulsation, heartbeat, a perspiration rate, brain waves, and body temperature) of a user which is detected by a biological sensor, and quantify a user emotion. As a specific example of emotion analysis using biological information, for example, as described in JP 2005-64839A, an emotion model that has been learned or individually learned again for a user may be used to obtain an emotion parameter value from a plurality of types of digitalized biological information. In addition, to more precisely recognize a user emotion, as described in JP 2007-41988A, a feature amount may be extracted from information such as a facial expression, gesture, voice of a user to predict a user emotion, an emotion of the user may be further predicted from meta-information of content that the user is watching and listening to, and the emotion of the user may be recognized on the basis of prediction results of these two.

The operation unit 12 receives an operation instruction of a user about a heating output. The operation unit 12 may be a touch sensor, a pressure sensor, a button, a switch, a lever, or the like. A user can operate the strength or ON/OFF of the heating output from the operation unit 12. Although not illustrated in FIG. 1, the operation unit 12 is provided, for example, on the top panel 20.

The output unit 13 has a function of outputting display showing a heating situation. For example, the output unit 13 projects and outputs an image on the outer surface of the cooking utensil 2 as illustrated in FIG. 1. In addition, the output unit 13 may be a display apparatus such as a liquid crystal display (LCD), an organic electroluminescence (EL) display.

The heating unit 14 has an electromagnetic induction heating function of making an electric current flow through the heating coil 141 to heat the cooking utensil 2 placed on the top panel 20.

The storage unit 15 stores a program and a parameter that allows the control unit 10-1 described above to execute each function. In addition, the storage unit 15 includes a storage apparatus including a storage medium, a recording apparatus that records data on the storage medium, a read-out apparatus that reads data out from the storage medium, a deletion apparatus that deletes data recorded in the storage medium, and the like.

The example of the configuration of the heating cooker 1-1 according to the present embodiment has been described above.

2-1-2. Operational Process

Next, an operational process of the heating cooker 1-1 according to the present embodiment will be described with reference to FIG. 3. FIG. 3 is a flowchart illustrating an operational process of the heating cooker 1-1 according to the first embodiment.

Figure 3:
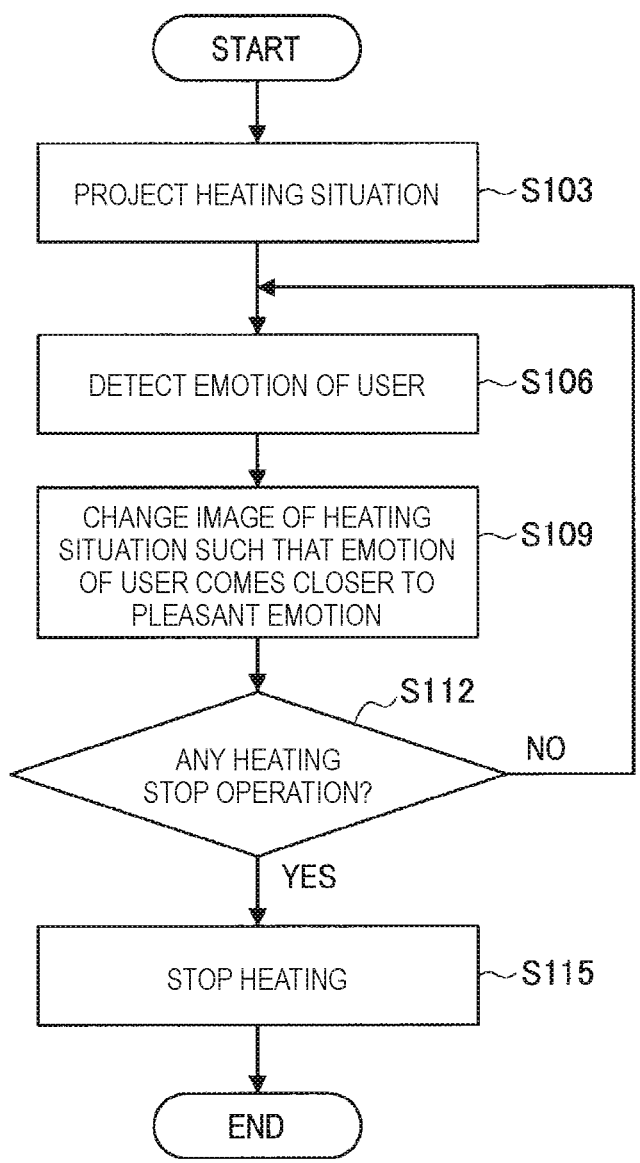
FIG. 3 is a flowchart illustrating an operational process of the heating cooker according to the first embodiment.

As illustrated in FIG. 3, first, the heating cooker 1-1 uses the heating situation projection control unit 101 to project an image on which a heating situation is displayed (step S103). Specifically, the heating situation projection control unit 101 projects a flame image showing the strength of the heating output on the outer surface of the cooking utensil 2 being heated as a heating situation.

Next, the heating cooker 1-1 uses the emotion detection unit 11 to detect an emotion of a cooking user (step S106). For example, the emotion detection unit 11 analyzes a facial expression of a user on the basis of a captured image taken by the camera 111, and quantifies an emotion of the user.

Next, the heating situation projection control unit 101 of the heating cooker 1-1 changes the image of the heating situation such that the emotion of the user comes closer to a pleasant emotion (step S109). For example, the heating situation projection control unit 101 uses a flickering pattern stored in the storage unit 15 to change a flame image showing a heating situation, and changes the flickering pattern by taking the feedback of an emotion detection result into consideration such that an emotion of a user comes closer to "pleasure."

Steps S106 to S109 described above are repeated until a heating stop operation is performed (step S112).

Then, once a heating stop operation (e.g., power OFF) is performed (step S112/Yes), the heating control unit 102 stops the heating unit 14 from heating (step S115). At this time, the heating situation projection control unit 101 is also stopped from projecting a flame image.

This makes it possible to afford entertainment such as imparting relaxing effects to a user with a flame image showing a heating situation.

The operational process according to the present embodiment has been specifically described above. Note that control according to the present embodiment which corresponds to a user emotion is not limited to projection control over a heating situation, but can also be used, for example, for control over a heating output. This will be described with reference to FIG. 4.

Figure 4:
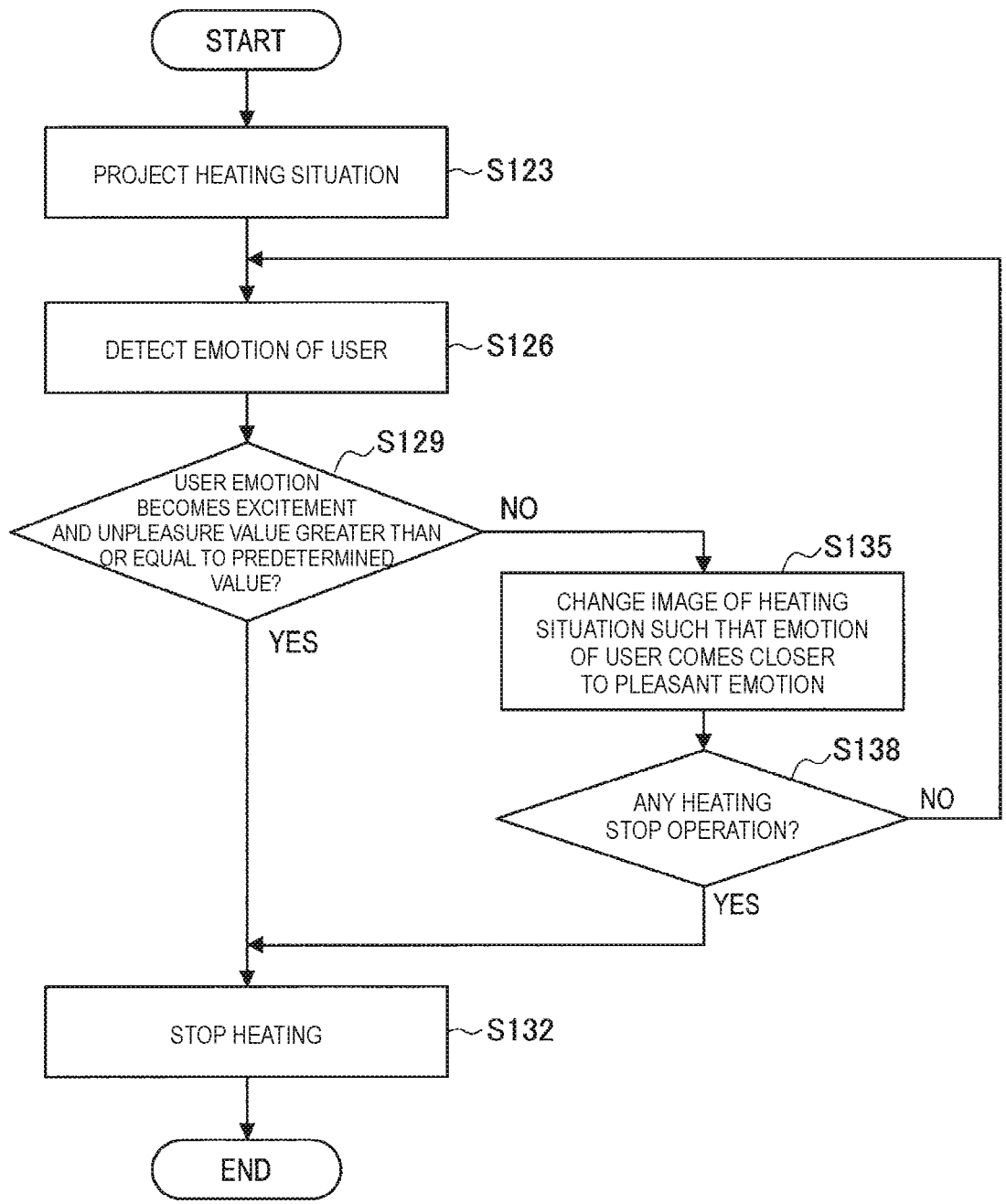
FIG. 4 is a flowchart illustrating another operational process of the heating cooker according to the first embodiment.

FIG. 4 is a flowchart illustrating another operational process of the heating cooker 1-1 according to the first embodiment. As illustrated in FIG. 4, first, the heating cooker 1-1 uses the heating situation projection control unit 101 to project an image on which a heating situation is displayed (step S123).

Next, the heating cooker 1-1 uses the emotion detection unit 11 to detect an emotion of a cooking user (step S126).

Next, the control unit 10-1 of the heating cooker 1-1 determines whether or not a user emotion becomes an excitement and unpleasure value greater than or equal to a predetermined value (step S129). When a user emotion becomes an excitement and unpleasure value greater than or equal to a certain level, it is possible to determine that a user faces an emergency and is in a panic state.

Next, in the case where it is determined that the user emotion becomes the excitement and unpleasure value greater than or equal to the predetermined value (step S129/Yes), the heating control unit 102 of the heating cooker 1-1 stops the heating unit 14 from heating because it is possible to determine that the user faces an emergency and is in a panic state (step S132). At this time, the heating situation projection control unit 101 is also stopped from projecting a flame image.

In contrast, in the case where it is determined that the user emotion does not become the excitement and unpleasure value greater than or equal to the predetermined value (step S129/No), the heating cooker 1-1 uses the heating situation projection control unit 101 to change an image of a heating situation similarly to the operational process described above such that the emotion of the user comes closer to a pleasant emotion (step S135).

Then, similarly to the operational process described above, once a heating stop operation (e.g., power OFF) is performed (step S138/Yes), the heating control unit 102 stops the heating unit 14 from heating (step S132).

This makes possible the operational process that also takes safety into consideration.

2-2. Second Embodiment

The first embodiment described above presupposes that it is a user or an operator (cook) operating the heating cooker 1 who is a target of emotion detection. However, the present embodiment is not limited thereto. It is also possible to perform a control process corresponding to a user emotion by using another person around the heating cooker 1 as a target of emotion detection.

For example, not only a cook, but those who do not cook or those who should be rather prevented from operating the heating cooker 1 to avoid danger (who will be referred to as non-cooks), for example, such as a child and an elderly person with dementia are also in the kitchen in which the heating cooker 1 is installed.

Then, in the present embodiment, recognizing a person who should not operate the heating cooker 1 or a person who should stay away from the heating cooker 1 to avoid danger and performing an appropriate operational process in accordance with a user emotion of the person make it possible to secure safety. The following specifically describes a second embodiment like this with reference to FIGS. 5 to 8.

2-2-1. Configuration

Figure 5:
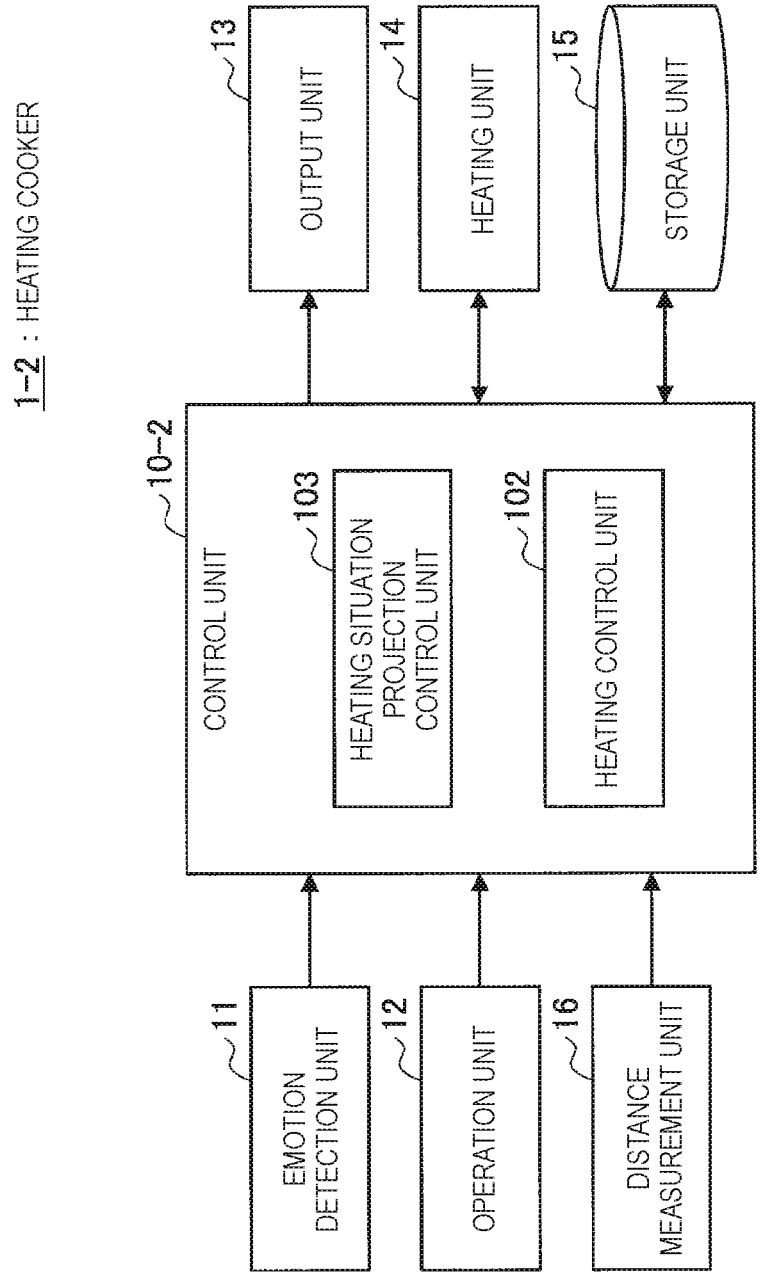
FIG. 5 is a block diagram illustrating an example of a configuration of a heating cooker according to a second embodiment.

FIG. 5 is a block diagram illustrating an example of the configuration of a heating cooker 1-2 according to the present embodiment. As illustrated in FIG. 5, the heating cooker 1-2 includes a control unit 10-2, the emotion detection unit 11, the operation unit 12, the output unit 13, the heating unit 14, the storage unit 15, and a distance measurement unit 16.

The control unit 10-2 functions as an arithmetic processing apparatus and a control apparatus, and controls the overall operation of the heating cooker 1-2 in accordance with a variety of programs. The control unit 10-2 is implemented, for example, by an electronic circuit such as a central processing unit (CPU) and a microprocessor. In addition, the control unit 10-2 may include a read only memory (ROM) that stores a program, an arithmetic parameter and the like to be used, and a random access memory (RAM) that temporarily stores a parameter and the like varying as appropriate.

In addition, the control unit 10-2 according to the present embodiment also functions as a heating situation projection control unit 103 and the heating control unit 102.

The heating situation projection control unit 103 performs control such that the display showing a heating situation by the heating unit 14 is projected by the output unit 13, similarly to the first embodiment described above. In addition, the heating situation projection control unit 103 according to the present embodiment can change a flame image to be projected in accordance with a user emotion of a non-cook which is detected by the emotion detection unit 11 when the non-cook comes closer to the heating cooker 1-2, and make the non-cook feel unpleasant or nervous to prevent the non-cook from coming closer to the heating cooker 1-2. Note that it can be determined whether or not he or she is a non-cook, for example, by determining whether he or she is an adult or a child. For example, in the case of a "child," it may be set in advance to determine that he or she is a non-cook. In addition, a user may register a face image of a non-cook in advance.

The heating control unit 102 controls a heating output by the heating unit 14 similarly to the first embodiment described above.

In addition, the emotion detection unit 11, the operation unit 12, the output unit 13, the heating unit 14, and the storage unit 15 are similar to those of the first embodiment described with reference to FIG. 2, so that they will not be described here. Note that the emotion detection unit 11 can detect a user emotion of a cook or a non-cook near the heating cooker 1-2 by analyzing a facial expression from each captured face image.

The distance measurement unit 16 can detect the distance to a cook or a non-cook near the heating cooker 1-2. For example, the distance measurement unit 16 may measure the distance to a nearby person by analyzing a captured image taken by the camera 111, or by detecting beacons emitted from a motion sensor using infrared rays or the like, a laser distance measurement sensor, or a communication terminal held by a non-cook.

The example of the configuration of the heating cooker 1-2 according to the present embodiment has been described above.

2-2-2. Operational Process

Figure 6:
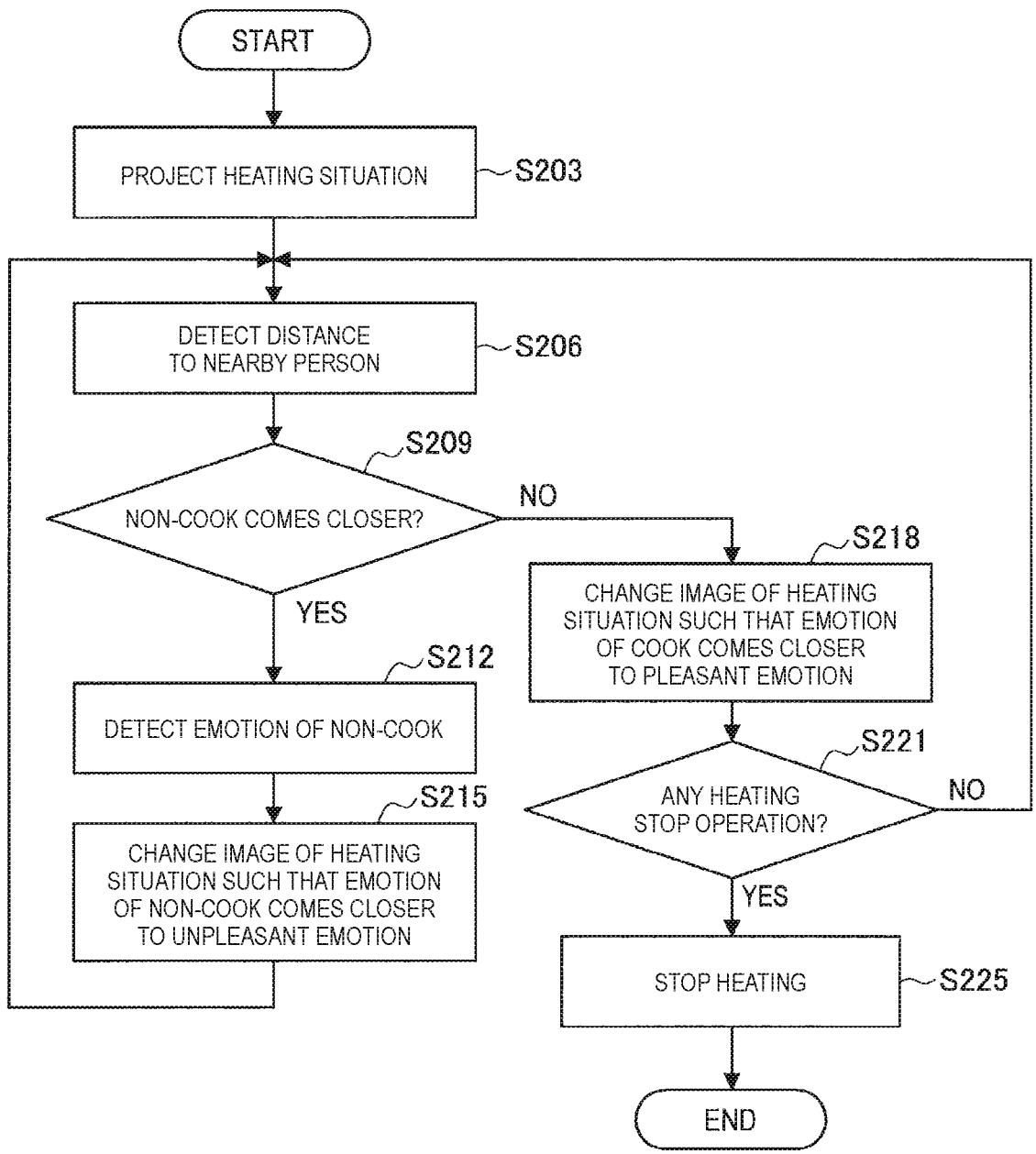
FIG. 6 is a flowchart illustrating an operational process of the heating cooker according to the second embodiment.

Next, an operational process of the heating cooker 1-2 according to the present embodiment will be described with reference to FIG. 6. FIG. 6 is a flowchart illustrating an operational process of the heating cooker 1-2 according to the second embodiment.

As illustrated in FIG. 6, first, the heating cooker 1-2 uses the heating situation projection control unit 103 to project an image on which a heating situation is displayed (step S203).

Next, the heating cooker 1-2 uses the distance measurement unit 16 to detect the distance to a nearby person from the heating cooker 1-2 (step S206).

Then, the heating cooker 1-2 determines whether or not a non-cook comes closer by a predetermined distance or more (step S209).

Next, in the case where the non-cook comes closer by the predetermined distance or more (step S209/No), the heating cooker 1-2 uses the emotion detection unit 11 to detect an emotion of the non-cook (step S212).

Next, the heating situation projection control unit 103 changes the image of the heating situation such that the emotion of the non-cook comes closer to an unpleasant emotion (step S215). For example, the heating situation projection control unit 103 adjusts the size or flickering amount of flames to make a user emotion of the non-cook come closer to "unpleasure and excitement or nervousness," and prevent the non-cook from coming closer. Specifically, the heating situation projection control unit 103 is supposed to make flames much larger and also make flames flicker to terrify the non-cook as the non-cook comes closer, to the flames.

In contrast, in the case where the non-cook does not come closer (step S209/No), the heating cooker 1-2 uses the heating situation projection control unit 103 to change an image of a heating situation such that an emotion of a cook comes closer to a pleasant emotion (step S218).

Then, once a heating stop operation (e.g., power OFF) is performed (step S221/Yes), the heating control unit 102 stops the heating unit 14 from heating (step S225). At this time, the heating situation projection control unit 103 is also stopped from projecting a flame image.

This can prevent a person, for example, a child other than a cook from being interested in flickering flames projected on the cooking utensil 2 and coming closer. Note that the heating cooker 1-2 can also prevent a child from coming closer by further emitting warning sound or the like.

In addition, to avoid danger, physically isolating the cooking utensil 2 is also a possible method. This will be described with reference to FIG. 7.

Figure 7:
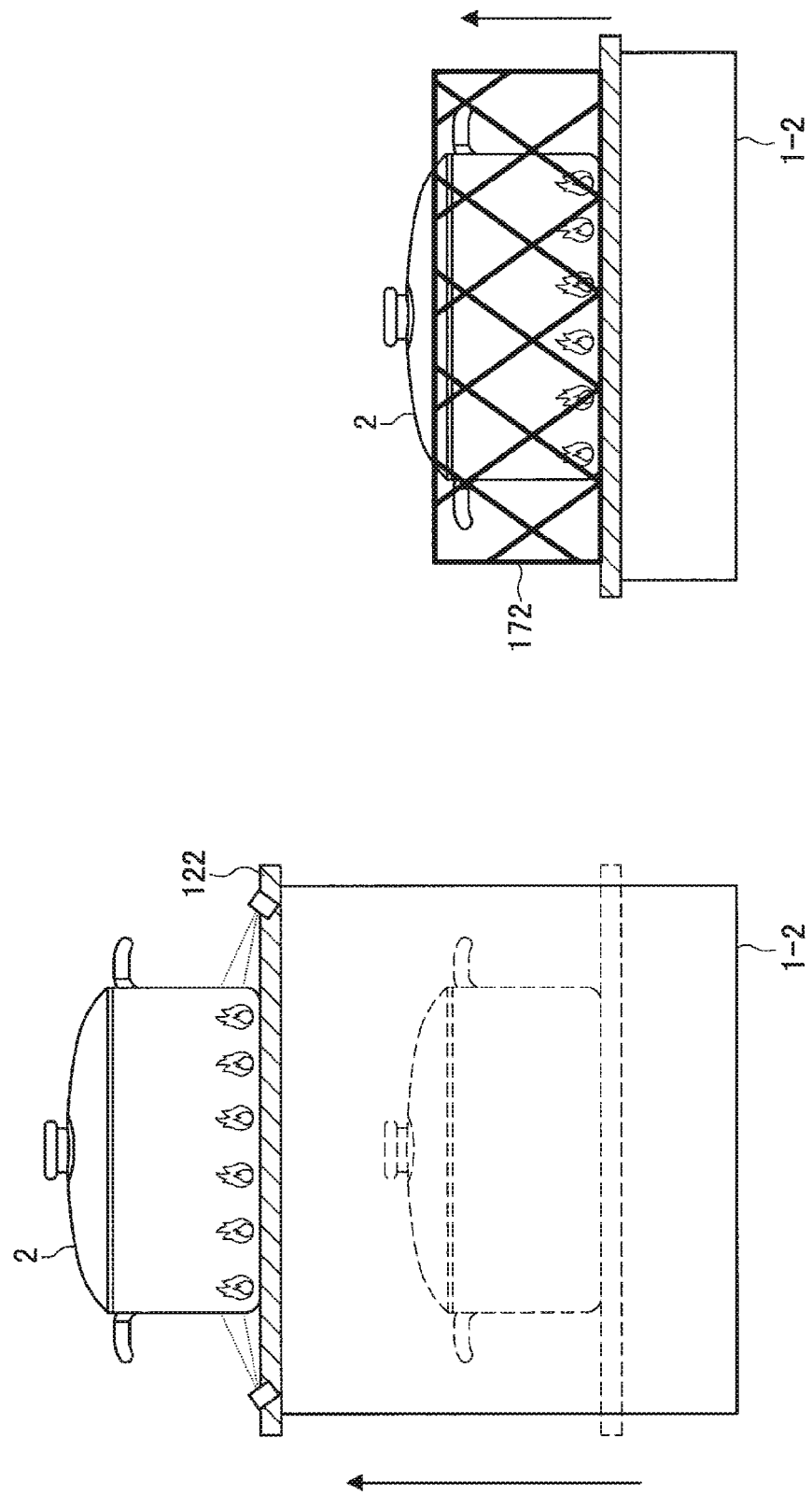
FIG. 7 is a diagram describing a method according to the second embodiment for physically isolating a cooking utensil to avoid danger.

FIG. 7 is a diagram describing a method for physically isolating the cooking utensil 2 to avoid danger. As illustrated on the left side in FIG. 7, for example, the top panel 20 of the heating cooker 1-2 is structured to rise upward, which can put the cooking utensil 2 away when a non-cook comes closer. In addition, as illustrated on the right side in FIG. 7, for example, a fence 172 is structured to appear around (at least in front of) the cooking utensil 2 on the top panel 20 from the heating cooker 1-2, which can make the fence 172 prevent a non-cook from coming closer when the non-cook comes closer.

Note that the heating cooker 1-2 may not only put the cooking utensil 2 away or make the fence 172 appear by a non-cook simply coming closer, but also perform an appropriate control process by using an emotion detection result. For example, the emotion parameter "excitement-relaxedness" of the second axis of the emotion model described above can be used to perform control such that the cooking utensil 2 is put further away and the fence 172 becomes higher, for example, in the case of a high degree of excitement, while permitting a non-operator to come closer to some extent in the case of a high degree of relaxedness.

In addition, in the example in which FIG. 7 is referred to, the area between the cooking utensil 2 and a non-operator which is actually dangerous is isolated by raising or lowering a stand or a fence, but, in this case, the degree of danger for a cook sometimes increases. Then, since a target in which a child is interested is supposed to be a flame image (part having a great visible change such as flickering) projected on the cooking utensil 2, it is made possible to achieve both operability and safety by separating the flame image from the cooking utensil 2 to guide the child away. This will be specifically described with reference to FIG. 8.

Figure 8:
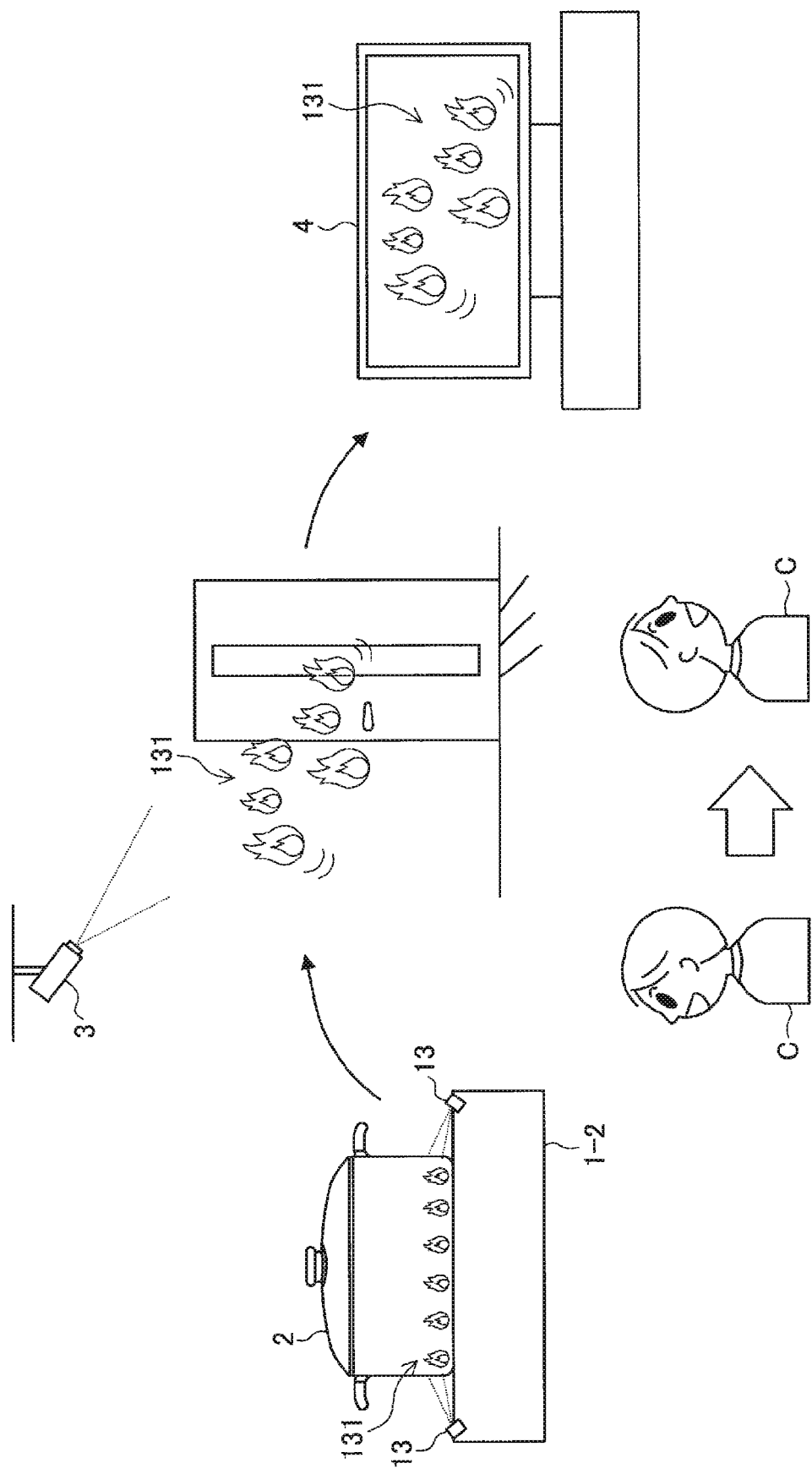
FIG. 8 is a diagram describing separation of a flame image according to the second embodiment.

FIG. 8 is a diagram describing the separation of a flame image 131 according to the present embodiment. The heating cooker 1-2 performs control such that the flame image 131 projected on the cooking utensil 2 by the output unit 13 is projected/displayed and output on the wall surface, a television receiver 4 in a living room over the wall surface, and another display apparatus such as a smartphone or a tablet terminal in the case where a non-cook C is coming closer.

For example, the heating cooker 1-2 may transmit the flame image 131 to a projector 3 connected through a home network or the like, and use the projector 3 to project the flame image 131 on the wall surface of a living room or the like.

In addition, control may be performed to cause the projector 3 to gradually move the flame image 131 from the cooking utensil 2, and the flame image 131 may be finally displayed and output on another display apparatus like the television receiver 4, for example, as illustrated in FIG. 8 while the movement of the non-cook C is guided. In this case, the heating cooker 1-2 may use an emotion detection result of the non-cook for appropriate guiding speed or interesting a non-cook to change the flame image 131 such that the non-cook feels "happy" or "pleasant."

In addition, the heating cooker 1-2 may project a flame image again on the cooking utensil 2 for a cook while moving the flame image 131 to guide a non-cook.

2-3. Third Embodiment

Next, an entertainment cooking system according to a third embodiment will be described. The present embodiment makes it possible to share the information of a cooking situation with another person in a remote location, cook together, and learn. This will be specifically described with reference to FIGS. 9 to 12.

Figure 9:
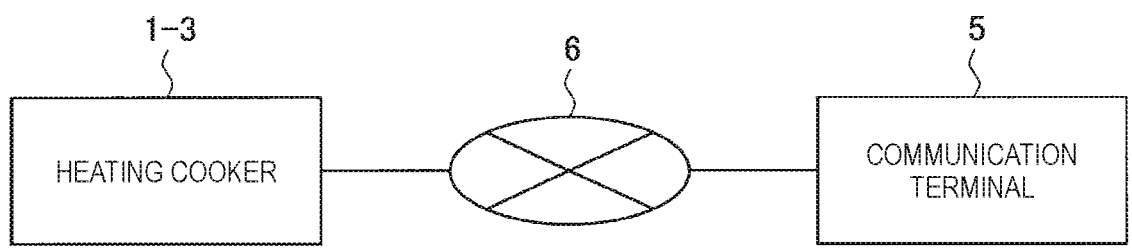
FIG. 9 is a diagram describing a system configuration of an entertainment cooking system according to a third embodiment.

FIG. 9 is a diagram illustrating a system configuration according to the present embodiment. As illustrated in FIG. 9, a heating cooker 1-3 according to the present embodiment can connect to a communication terminal 5 of a sharing destination via a network 6, and transmit and receive data. In addition, the communication terminal 5 is implemented by, for example, a smartphone, a mobile telephone terminal, a tablet terminal, a PC, or the like.

The heating cooker 1-3 according to the present embodiment transmits a cooking situation (specifically, for example, a captured image or the like obtained by imaging a heating situation or a cooking situation) to the communication terminal 5 to share the cooking situation. The communication terminal 5 displays the cooking situation, receives a heating adjustment operation (strength, ON/OFF, and the like of the heating output) as required, and transmits it to the heating cooker 1-3 as heating operation information. Then, the heating cooker 1-3 controls the heating output in accordance with the received heating operation information to make it possible to cook together with another user in a remote location.

2-3-1. Configuration

Figure 10:
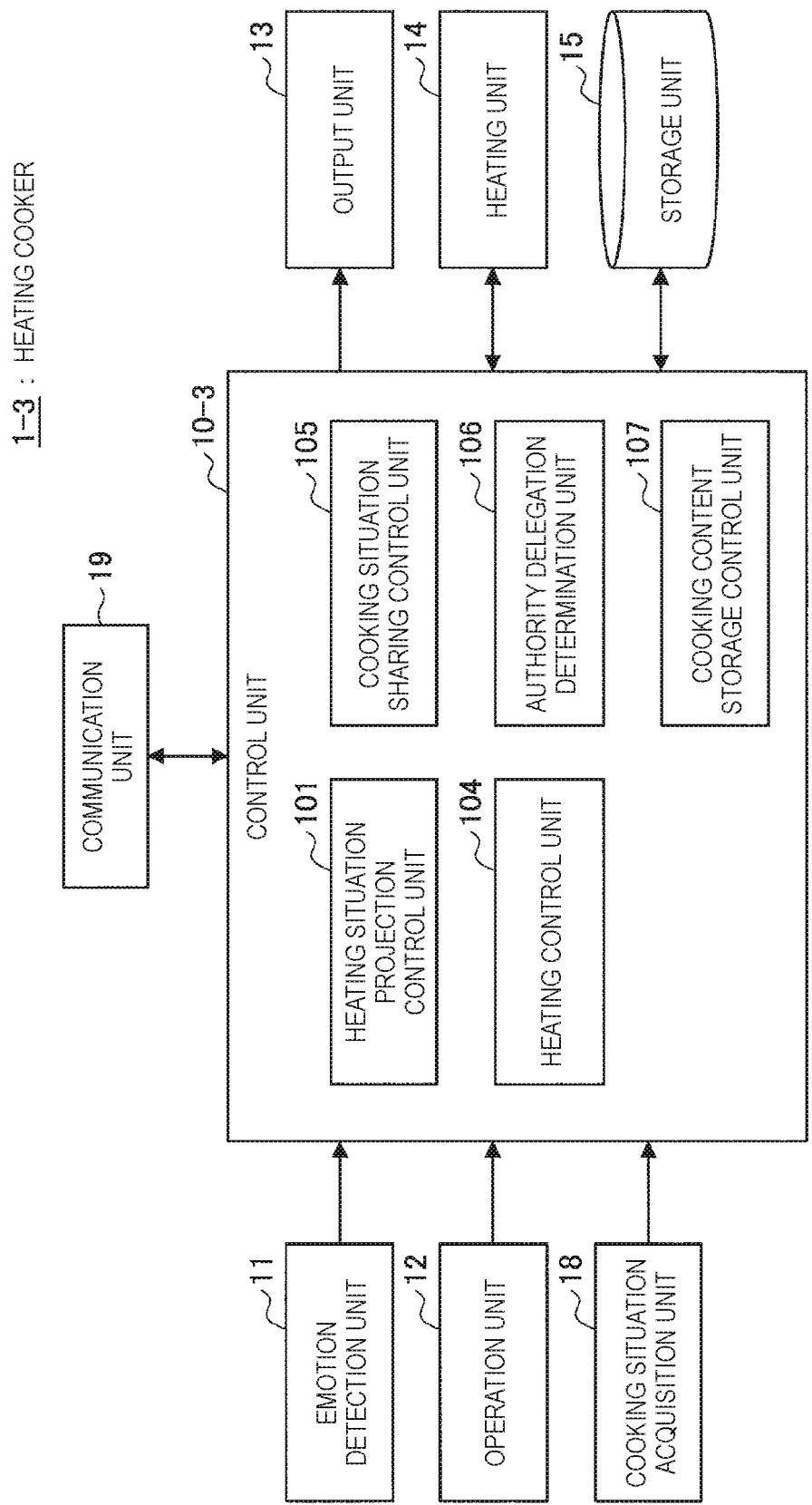
FIG. 10 is a block diagram illustrating an example of a configuration of a heating cooker according to the third embodiment.

Next, the configuration of the heating cooker 1-3 according to the present embodiment will be described with reference to FIG. 10. FIG. 10 is a block diagram illustrating a configuration example of a heating cooker 1-3 according to the present embodiment. As illustrated in FIG. 10, the heating cooker 1-3 includes a control unit 10-3, the emotion detection unit 11, the operation unit 12, the output unit 13, the heating unit 14, the storage unit 15, a cooking situation acquisition unit 18, and a communication unit 19.

The control unit 10-3 functions as an arithmetic processing apparatus and a control apparatus, and controls the overall operation of the heating cooker 1-3 in accordance with a variety of programs. The control unit 10-3 is implemented, for example, by an electronic circuit such as a central processing unit (CPU) and a microprocessor. In addition, the control unit 10-2 may include a read only memory (ROM) that stores a program, an arithmetic parameter and the like to be used, and a random access memory (RAM) that temporarily stores a parameter and the like varying as appropriate.

In addition, the control unit 10-3 according to the present embodiment also functions as the heating situation projection control unit 101, a heating control unit 104, a cooking situation sharing control unit 105, an authority delegation determination unit 106, and a cooking content storage control unit 107.

The heating situation projection control unit 101 performs control such that the display showing a heating situation by the heating unit 14 is projected by the output unit 13, similarly to the first embodiment described above. In addition, the heating situation projection control unit 101 changes a flame image to be projected in accordance with a detected user emotion such that a user has a pleasant emotion similarly to the first embodiment described above.

The heating control unit 104 controls a heating output by the heating unit 14. A heating output is controlled not only in accordance with an operation from a user through operation unit 12, but a heating output is also controlled in accordance with heating operation information received from the communication terminal 5 of a sharing destination via the communication unit 19.

The cooking situation sharing control unit 105 transmits the information of a cooking situation to the communication terminal 5 of a sharing destination from the communication unit 19 via the network 6. The information of a cooking situation includes, for example, a cooking video captured by the camera 111, a heating situation (state of a heating output), recipe information to which a user refers, a dish name, flavor preference, the information of a used material, and the like. Here, FIG. 11 will be referred to to describe cooking situation sharing.

FIG. 11 is a diagram describing cooking situation sharing according to the present embodiment. As illustrated in FIG. 11, in the present embodiment, the situation in which the heating cooker 1-3 is used for cooking is imaged by the camera 111 and transmitted to the communication terminal 5 of a sharing destination as the information of a cooking situation. An emotion detection result of a user may also be transmitted together to the communication terminal 5 of a sharing destination.

A display screen of the communication terminal 5 displays a captured image 51 obtained by imaging a cooking situation, an emotion detection result 52, display showing the heating authority is delegated, and buttons (strength and ON/OFF) for heating operations. The strength of the heating output of the heating cooker 1-3 can be grasped from a flame image projected on the cooking utensil 2, but the strength of the heating output may be separately displayed on the display screen of the communication terminal 5 in the form of numerical values or words.

A sharer can cook together with a user in a remote location by verbally inputting cooking advice, making a literal input or making an input with video (such as video call) for a user while watching the captured image 51, or making an adjustment to an appropriate heating output when the heating authority is delegated and the buttons for heating operations are displayed. For example, the sharer can predict the following situation from the cooking situation and the emotion state of a user (cook), and give advice or make a heating adjustment. Specifically, for example, in the case where a user is nervous and is not moving a hand even if the heating output is too strong and food is going to be burnt, the sharer gives advice to weaken the heating output or makes a heating adjustment. In addition, in the case where the strength of the heating output is appropriate, but a user is relaxed and is not concentrating though the timing of stopping heating is coming, the sharer gives advice to weaken the heating output or makes a heating adjustment. In addition, in the case where the heating output is weak though a user is in a hurry (rushed) emotion state, advice is given to strengthen the heating output or a heating adjustment is made. Advice input in a verbal or literal manner is verbally output or displayed (projected) and output on the user side. This allows a user (cook) to learn in which scene the user can be relaxed, and on what scene the user should keep an eye (concentrate) while cooking.

The communication terminal 5 is implemented by a communication terminal such as a mobile telephone terminal, a tablet terminal, a personal computer (PC), or a wearable terminal (head mounted display (HMD), a transmissive HMD, or a smartwatch) that includes a display unit in addition to the smartphone as illustrated in FIG. 11. Alternatively, the communication terminal 5 may be a home projector capable of projecting an image on the wall surface of a kitchen or a living room, a table, and the like. In addition, a flame image corresponding to a heating situation of a user side may also be projected on the cooking utensil 2 placed in the kitchen on a sharer side.

The authority delegation determination unit 106 determines whether or not to delegate the heating operation authority to a user (sharer) of a sharing destination. For example, the authority delegation determination unit 106 determines on the basis of a detection result of a user emotion from the emotion detection unit 11 that the heating operation authority is delegated to a user of a sharing destination in the case where a user reaches a certain or higher degree of nervousness (in the case where a predetermined value is exceeded). For example, in the case where a user is in the state of a certain or higher level of nervousness, or in the case where a user is in the state of no concentration, the user is likely to burn food or fail to cook. Accordingly, the authority delegation determination unit 106 determines that the heating operation authority is delegated to a sharer.

Note that a sharer may be designated in advance by a user when cooking is begun, or may automatically selected by the heating cooker 1-3 from candidates (such as a cooking teacher and a family member living in a remote place) registered beforehand in the case were the operation authority has to be delegated to someone in the middle of cooking. In the case of the automatic selection, for example, a person who is sufficiently relaxed among the candidates may be selected.

The cooking content storage control unit 107 performs control such that the information (such as captured image, operation history of a heating output, and recipe information) of the cooking situation of a user, advice transmitted from a sharer side, heating operation information, and the like are stored in the storage unit 15 as a cooking history. Accumulating cooking histories makes it possible to make a presentation later that explains why the heating output is adjusted by the sharer by using a displayed graph or the like.

In addition, a cooking flow or an adjustment content history of the heating output in which cooking results in success is also used to generate a "cooking game" as described below.

The cooking situation acquisition unit 18 acquires the information of the cooking situation of a user side. Specifically, for example, a cooking video is acquired from the camera 111 as the information of a cooking situation. In addition, a heating situation (state of the heating output) is acquired from the heating unit 14 as the information of a cooking situation. In addition, recipe information to which a user refers, a dish name, flavor preference, the information of a used material, and the like are acquired from a communication terminal such as a smartphone used by the user (it is assumed that they have been displayed by the user inputting them or conducting a recipe search). Alternatively, the used material may be acquired according to object recognition from a captured image obtained by the camera 111 imaging the area around the kitchen, or the captured image may be presented to a sharer as used material information.

The communication unit 19 is a communication module for transmitting and receiving data to and from another apparatus in a wired/wireless manner. The communication unit 19 wirelessly communicates with an external apparatus directly or via a network access point in a scheme, for example, a wired local area network (LAN), a wireless LAN, Wireless Fidelity (Wi-Fi) (registered trademark), infrared communication, Bluetooth (registered trademark), short-range/contactless communication, and the like.

Note that the emotion detection unit 11, the operation unit 12, the output unit 13, the heating unit 14, and the storage unit 15 according to the present embodiment are similar to those of the first embodiment described with reference to FIG. 2, so that they will not be described here.

The configuration of the heating cooker 1-3 according to the present embodiment has been specifically described above.

2-3-2. Operational Process

Figure 12:
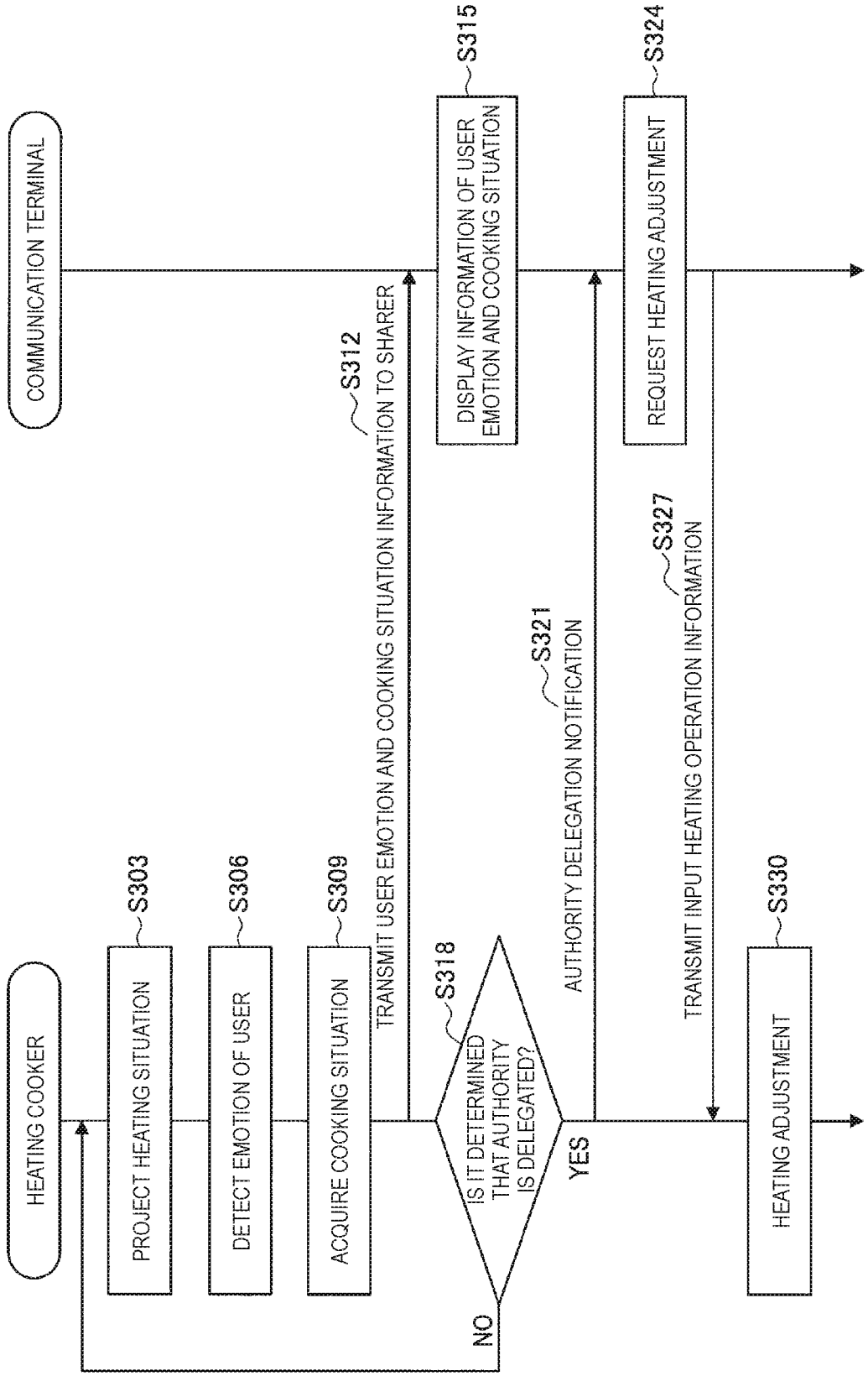
FIG. 12 is a sequence diagram illustrating an operational process of the heating cooker according to the third embodiment.

Next, an operational process of the entertainment heating cook system according to the present embodiment will be described with reference to FIG. 12. FIG. 12 is a sequence diagram illustrating an operational process according to the present embodiment.

As illustrated in FIG. 12, first, the heating cooker 1-3 uses the heating situation projection control unit 101 to project an image on which a heating situation is displayed (step S303).

Next, the heating cooker 1-3 uses the emotion detection unit 11 to detect an emotion of a cooking user (step S306).

Then, the heating cooker 1-3 uses the cooking situation acquisition unit 18 to acquire a cooking situation (step S309).

Next, the cooking situation sharing control unit 105 of the heating cooker 1-3 transmits the information of the detected user emotion and the acquired cooking situation to a sharer (step S312).

Then, the communication terminal 5 displays the received information of the user emotion and the cooking situation (step S315). The sharer can advise the user as appropriate with reference to the user emotion and the cooking situation.

Next, the authority delegation determination unit of the heating cooker 1-3 determines on the basis of the user emotion whether or not to delegate the heating authority to the sharer (step S318).

Next, in the case where it is determined that the heating authority is delegated to the sharer (step S318/Yes), the control unit 10-3 of the heating cooker 1-3 notifies the communication terminal 5 of a sharing destination that the heating authority is delegated (step S321).

Then, the communication terminal 5 requests the sharer to make a heating adjustment (such as displaying "operate to heat") (step S324), and transmits the input heating operation information to the heating cooker 1-3 (step S327).

Then, the heating control unit 104 of the heating cooker 1-3 adjusts the heating output of the heating unit 14 in accordance with the received heating operation information by the sharer (step S330).

With this arrangement, in the present embodiment, it is possible to share a cooking situation with another person to receive appropriate advice from the other person, or delegate a heating adjustment to another person to cook together.

2-4. Supplemental Information

Next, an example for further enhancing the entertainment of an entertainment heating cook system according to the present embodiment will be supplemented.

2-4-1. Variation in Cooking Situation Projection

In each of the embodiments described above, a flame image corresponding to a heating situation is projected on the cooking utensil 2, but the present embodiment is not limited thereto. A video of the inside of the cooking utensil 2 may be further projected. The video of the inside of the cooking utensil 2 is captured by a camera provided in a kitchen or a camera provided to the cooking utensil 2.

Further, the video of the inside of the cooking utensil 2 is not limitative. Information such as the temperature information and the fragrance information of the inside of the cooking utensil 2 detected by a variety of sensors provided to the cooking utensil 2 and the heating cooker 1 may be projected on the cooking utensil 2 or the area around the cooking utensil 2. The fragrance information may be the numerical value of the amount of fragrance substance components detected by a sensor that measures fragrance substances.

Figure 13:
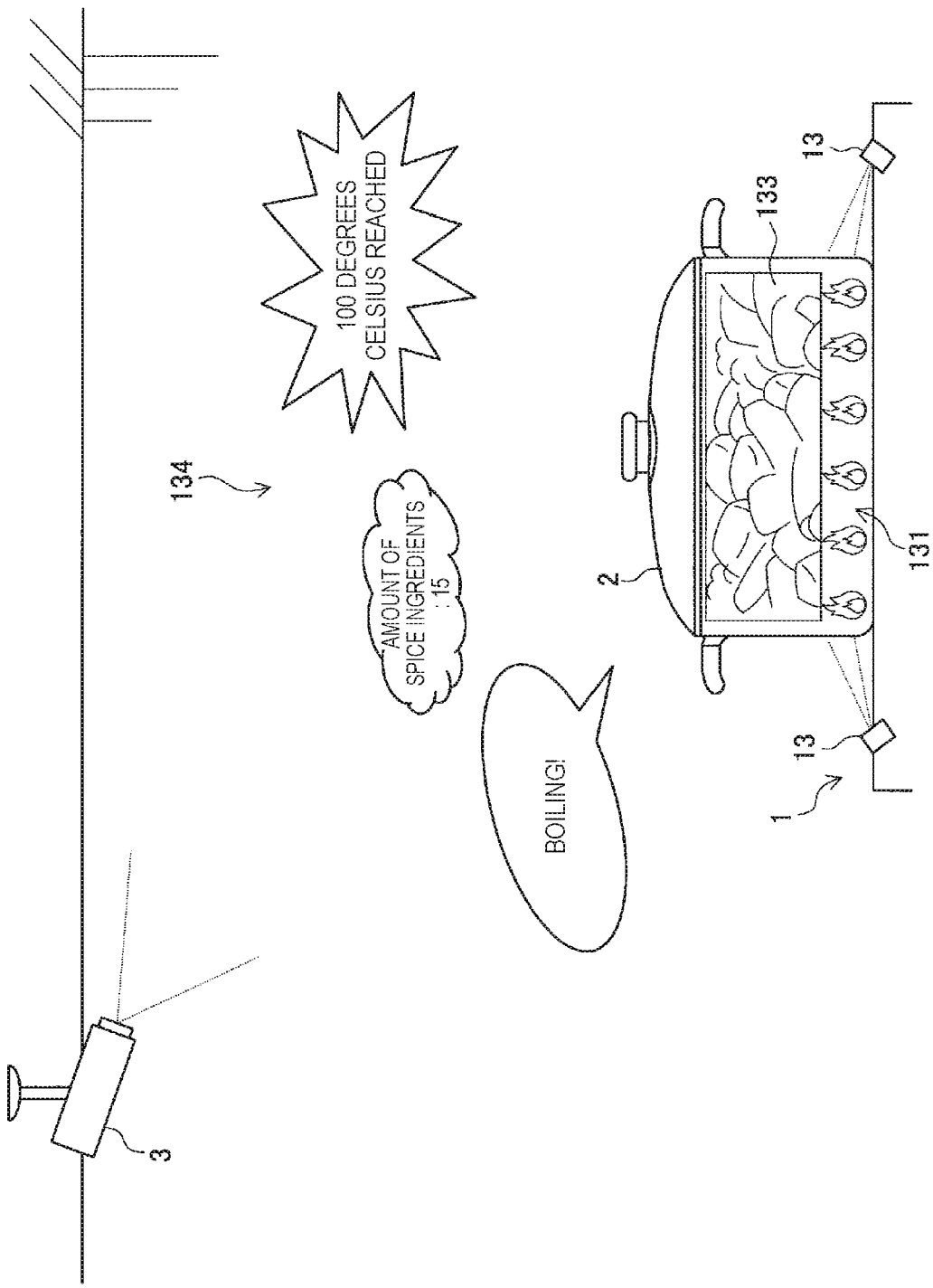
FIG. 13 is a diagram illustrating an example in which various kinds of information during cooking according to an embodiment of the present disclosure is presented.

Here, FIG. 13 illustrates an example in which various kinds of information during cooking is presented. As illustrated in FIG. 13, the output unit 13 of the heating cooker 1 projects the flame image 131 corresponding to a heating situation, and a video 133 of the inside of the cooking utensil 2 on the outer surface of the cooking utensil 2. In addition, the projector 3 projects various detection results 134 such as temperature, fragrance, and a cooking situation in real time. At this time, it is possible to not only display simply an actually measured result, but also detect an emotion of a watcher and deform the displayed result such that the emotion comes closer to a "pleasant and excited" state to further enhance entertainment.

Figure 14:
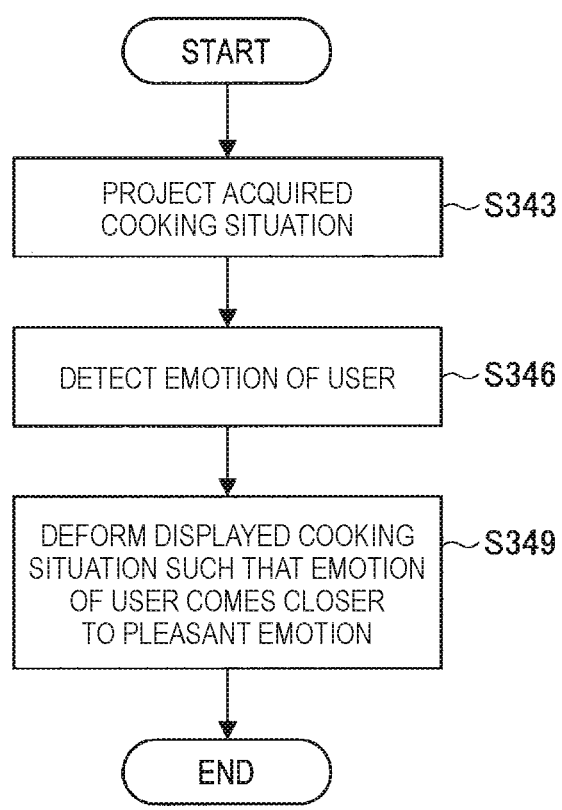
FIG. 14 is a flowchart of a deformation display process according to an embodiment of the present disclosure which takes a user emotion into consideration.

FIG. 14 is a flowchart of a deformation display process that takes a user emotion into consideration. As illustrated in FIG. 14, first, the heating cooker 1 projects an acquired cooking situation from the output unit 13 or the projector 3 (step S343).

Next, the heating cooker 1 detects an emotion of a user (step S346), and deforms the displayed cooking situation such that the emotion of the user comes closer to a pleasant emotion (e.g., "pleasant and excited") (step S349). More specifically, the heating cooker 1 learns by repeating deformation display and emotion detection, and performs deformation display such that the emotion of the user comes closer to "pleasant and excited." For example, in the case of a great change in temperature, temperature is displayed larger and a temperature display method optimum for a user is learned in accordance with whether or not an emotion of the user swings in a "pleasant and excited" direction. In addition, in the case where the amount of fragrance components exceeds 100, red and large display is performed, and a method for displaying the amount of fragrance components which is optimum for a user is learned in accordance with whether or not an emotion of the user swings in a "pleasant and excited" direction.

Figure 15:
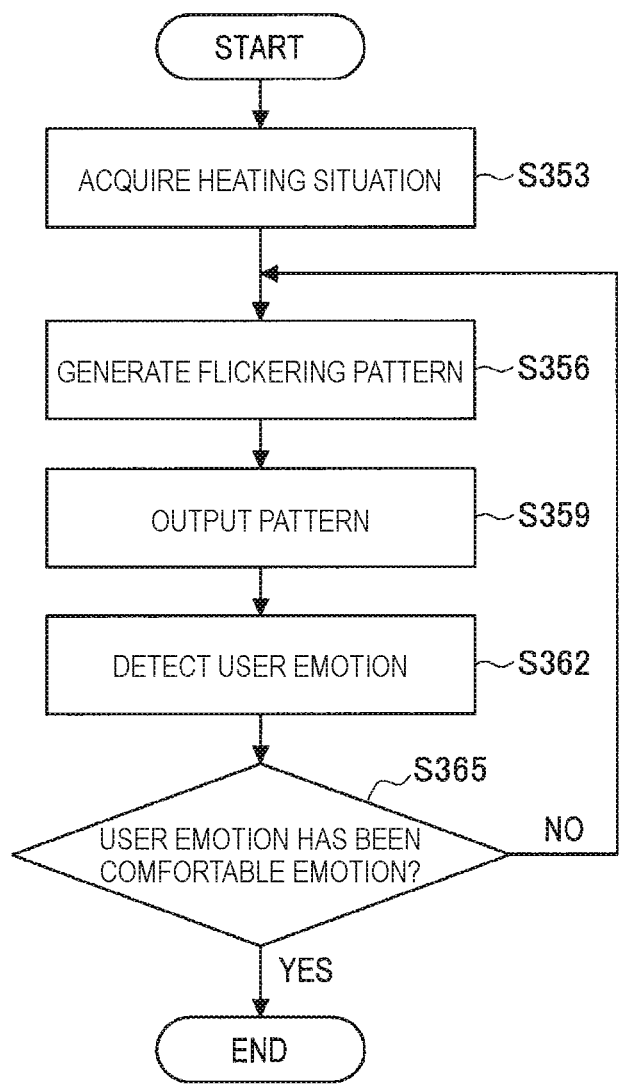
FIG. 15 is a flowchart illustrating a flickering learning process according to an embodiment of the present disclosure.

Such learning is also applied to the generation of the flame image 131 corresponding to the heating output. FIG. 15 is a flowchart illustrating a flickering learning process according to the present embodiment.

As illustrated in FIG. 15, first, the heating cooker 1 acquires a heating situation (step S353). The heating situation is a situation of a heating output by the heating unit 14, and examples thereof include an operation input value from the operation unit 12, an electric current value of the heating coil 141, heating temperature, or the like.

Next, the heating cooker 1 generates a flickering pattern of flames (step S356). The flickering pattern of flames is generated from the acquired heating situation described above, a certain degree of random number information, and a past flickering pattern.

Then, the heating cooker 1 outputs the generated flickering pattern (step S359). Specifically, for example, the output unit 13 projects flames in the generated flickering pattern.

Next, the heating cooker 1 detects a user emotion (step S362), and determines whether or not the user emotion has been a pleasant emotion (e.g., comfortable emotion) (step S365). In the case where the user emotion has not been a pleasant emotion (step S365/No), the processes from step S356 described above are repeated, and the flickering pattern is changed. Note that the heating cooker 1 may use a genetic algorithm to retain a plurality of flickering patterns with them regarded as genes, feed back a user emotion (whether "pleasant" or "unpleasant") as an evaluation function for the time of actually outputting them, and learn a flickering pattern that is comfortable for the user.

Note that the flickering pattern corresponds to, in the case where the heating cooker 1 is a microwave oven, flickering lighting in the oven, or blinking indicators of a variety of heating cookers in addition to a flickering flame.

The above-described information such the temperature information and the fragrance information of the inside of the cooking utensil 2 detected by a variety of sensors provided to the cooking utensil 2 and the heating cooker 1 can also be transmitted to a sharing destination described in the third embodiment as the information of a cooking situation, and displayed on the communication terminal 5. In addition, in the case where a kitchen of a sharing destination also has a heating cooker according to the present embodiment, and a cooking utensil is placed thereon, the flame image 131 and the video 133 of the inside of the cooking utensil 2 may be projected on the outer surface of the cooking utensil, and the various detection results 134 of the cooking situation may be projected on the nearby wall surface similarly to the projection example illustrated in FIG. 13. This allows even a user of a sharing destination to give cooking advice or make a heating adjustment as if the user of a sharing destination stood and cooked in the same kitchen as that of the cooking user.

2-4-2. Cooking Game

In addition, the entertainment heating cook system according to the present embodiment can also offer further game characteristics.

For example, a cooking situation of a model person may be stored in advance, and compared with a cooking situation of a user for scoring. For example, if an operation of the heating output is correct, an image showing "Heat strength is OK!" is projected around a kitchen to add a point.

In addition, a game is also conceivable in which, though no ingredients are actually prepared, a "heating output operation of a master" and a "resultant video" are used, and a user performs a heating output operation for scoring in accordance with the timing of the presented "heating output operation of a master." At this time, a heating output operation on a heating cooker is not limitative. Operations on a plurality of heating cookers and cooking utensil, and cooking operations are combined substantially in parallel to make it also possible to enhance the game characteristics.

2-4-3. Application

Each of the embodiments described above has described an example in which the so-called stove heating cooker 1 in which the cooking utensil 2 is placed on a top panel and a heating coil provided under the top panel is used for heating projects the flame image 131 on the cooking utensil 2 as an image showing a heating situation, but the present embodiment is not limited thereto. The present embodiment can be applied to all apparatuses that visualize again a process which has been visible for enabling an intuitive operation when the process is made invisible by changing a mechanism.

For example, the heating cooker according to the present embodiment may be a microwave oven heating cooker. When a microwave oven is used for heating, for which a pot (that can be directly watched: visible) has been usually used, the contents cannot be directly watched: invisible. Then, a video obtained by imaging the internal situation may be displayed on the outside of the door of the microwave oven heating cooker for making the inside visible, or a flame image may be displayed on the outside of the door in accordance with the heating strength. In addition, the flickering lighting in the oven can also be changed to make a user have a comfortable emotion.

4. Conclusion

As described above, an entertainment cooking system according to an embodiment of the present disclosure makes it possible to change a presentation of a cooking situation in accordance with a user emotion.

Specifically, according to the first embodiment described above, it is possible to change a flame image to be projected to make a user to intuitively grasp a heating situation in electric heating in accordance with a user emotion, and make the user have a more pleasant emotion.

In addition, according to the second embodiment described above, it is possible to prevent a non-cook (chiefly a child or an elderly person with dementia) who is not a cook from coming further closer when he or she comes closer to a dangerous thing such as a heating unit during cooking.

In addition, according to the third embodiment described above, it is possible to make a cooking situation be shared and serve as a learning place, or deform a displayed cooking situation to make a watcher enjoy himself or herself. In addition, a user emotion is also sensed, so that it is also possible to learn in which scene a user may be relaxed, and on what scene a user should keep an eye (concentrate) while cooking.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM, and a RAM built in the heating cooker 1 described above to perform the functions of the heating cooker 1. In addition, there is also provided a computer-readable storage medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including:
an emotion detection unit configured to detect an emotion of a user; and
a control unit configured to perform control such that a heating situation during cooking is displayed and output, in which
the control unit changes display of the heating situation in accordance with a user emotion detected by the emotion detection unit.

(2)
The information processing apparatus according to (1), in which
the control unit performs control such that a flame image corresponding to a heating output is displayed as the heating situation.

(3)
The information processing apparatus according to (2),
in which the control unit changes size or flickering of a flame to be displayed in accordance with the detected user emotion to guide a user to a pleasant emotion.

(4)
The information processing apparatus according to any one of (1) to (3), in which
the control unit performs control such that the display of the heating situation is projected on a cooking utensil.

(5)
The information processing apparatus according to any one of (1) to (4), in which
the control unit performs control such that a heating coil stops heating when the user emotion detected by the emotion detection unit becomes a degree of nervousness or an unpleasure value greater than or equal to a predetermined value.

(6)
The information processing apparatus according to any one of (1) to (5), in which
the emotion detection unit detects emotions of a cook and a non-cook, and
the control unit changes, in a case where the non-cook comes closer to a heating place, size or flickering of flame to be displayed in accordance with the emotion of the non-cook to guide a non-cook to an unpleasant or nervous state.

(7)
The information processing apparatus according to any one of (1) to (6), in which
the control unit performs control such that the display of the heating situation is displayed on an external display apparatus.

(8)
The information processing apparatus according to any one of (1) to (7), in which
the control unit causes a place to be moved in which the display of the heating situation is projected in a case where a non-cook comes closer to a heating place such that the non-cook goes away from the heating place.

(9)
The information processing apparatus according to any one of (1) to (8), in which
the control unit performs control such that information of a cooking situation including the heating situation is shared with another user in real time.

(10)
The information processing apparatus according to (9), in which
the control unit determines in accordance with the emotion of the user whether or not heating adjustment authority is delegated to the other user.

(11)
The information processing apparatus according to (10), in which
the control unit performs control such that, in a case where a degree of nervousness of the user exceeds a predetermined value, the heating adjustment authority is delegated to the other user.

(12)
The information processing apparatus according to (10) or (11), in which
the control unit performs control such that a captured image obtained by imaging an inside of a cooking utensil during cooking is included in information of a cooking situation, and transmitted to a communication terminal of the other user.

(13)
An information processing method including, by a processor:
detecting an emotion of a user;
performing control such that a heating situation during cooking is displayed and output; and
changing display of the heating situation in accordance with the detected user emotion.

(14)
A program for causing a computer to function as
an emotion detection unit configured to detect an emotion of a user, and
a control unit configured to perform control such that a heating situation during cooking is displayed and output, in which
the control unit changes display of the heating situation in accordance with a user emotion detected by the emotion detection unit.

REFERENCE SIGNS LIST 1 heating cooker
10 control unit
101, 103 heating situation projection control unit
102, 104 heating control unit
105 cooking situation sharing control unit
106 authority delegation determination unit 107 cooking content storage control unit
11 emotion detection unit
12 operation unit
13 output unit
14 heating unit
141 heating coil
15 storage unit
16 distance measurement unit
18 cooking situation acquisition unit
19 communication unit
20 top panel
131 flame image
133 video in cooking utensil
134 various detection results
2 cooking utensil
3 projector
4 television receiver
5 communication terminal
6 network
111 camera

The invention claimed is:

1. An information processing apparatus, comprising:
   circuitry configured to:
   detect an emotion of a first user;
   control display of a heating situation at a time of cooking, wherein the display of the heating situation is controlled based on the detected emotion of the first user;
   transmit information associated with a cooking situation to a second user in real time, wherein the information associated with the cooking situation includes information associated with the heating situation;
   determine that a degree of nervousness of the first user exceeds a threshold value based on the detected emotion of the first user; and
   delegate heating adjustment authority to the second user based on the determination.

2. The information processing apparatus according to claim 1, wherein the circuitry is further configured to control display of a flame image corresponding to a heating output as the heating situation.

3. The information processing apparatus according to claim 2, wherein the circuitry is further configured to control change in at least one of a size or flickering of the flame image to be displayed based on the detected emotion of the first user, to guide the first user to a pleasant emotion.

4. The information processing apparatus according to claim 1, wherein the circuitry is further configured to control projection of the heating situation on a cooking utensil.

5. The information processing apparatus according to claim 1, wherein the circuitry is further configured to stop a heating coil based on at least one of the determination that the degree of nervousness exceeds the threshold value or determination that an unpleasure value exceeds the threshold value.

6. The information processing apparatus according to claim 1, wherein the circuitry is further configured to:
   detect emotion of a third user, wherein the third user is a non-cook;
   determine that the third user is within a threshold distance from a heating place; and
   change, when the third user is within the threshold distance from the heating place, at least one of a size or flickering of a flame image to be displayed based on the detected emotion of the third user, to guide the third user to at least one of an unpleasant state or a nervous state.

7. The information processing apparatus according to claim 1, wherein the circuitry is further configured to control display of the heating situation on an external display apparatus.

8. The information processing apparatus according to claim 1, wherein the circuitry is further configured to:
   determine that a third user is within a threshold distance from a heating place, wherein the third user is a non-cook; and
   move, when the third user is within the threshold distance from the heating place, projection of the heating situation to guide the non-cook away from the heating place.

9. The information processing apparatus according to claim 1, wherein
   the information associated with the cooking situation further includes a captured image of an inside of a cooking utensil at a time of cooking, and
   the circuitry is further configured to transmit the captured image to a communication terminal of the second user.

10. An information processing method, comprising:
    detecting, by a processor, an emotion of a first user;
    control, by the processor, display of a heating situation at a time of cooking, wherein the display of the heating situation is controlled based on the detected emotion of the first user;
    transmitting, by the processor, information associated with a cooking situation to a second user in real time, wherein the information associated with the cooking situation includes information associated with the heating situation;
    determining, by the processor, that a degree of nervousness of the first user exceeds a threshold value based on the detected emotion of the first user; and
    delegating, by the processor, heating adjustment authority to the second user based on the determination.

11. A non-transitory computer-readable medium having stored thereon computer-executable instructions, that when executed by a processor, cause the processor to execute operations, the operations comprising:
    detecting an emotion of a first user;
    controlling display of heating situation at a time of cooking, wherein the display of the heating situation is controlled based on the detected emotion of the first user;
    transmitting information associated with a cooking situation to a second user in real time, wherein the information associated with the cooking situation includes information associated with the heating situation;
    determining that a degree of nervousness of the first user exceeds a threshold value based on the detected emotion of the first user; and
    delegating heating adjustment authority to the second user based on the determination.

* * * * *